Oct. 1, 1940.  F. PAULIN  2,216,453
STAPLING MACHINE
Filed Sept. 26, 1938  5 Sheets-Sheet 1
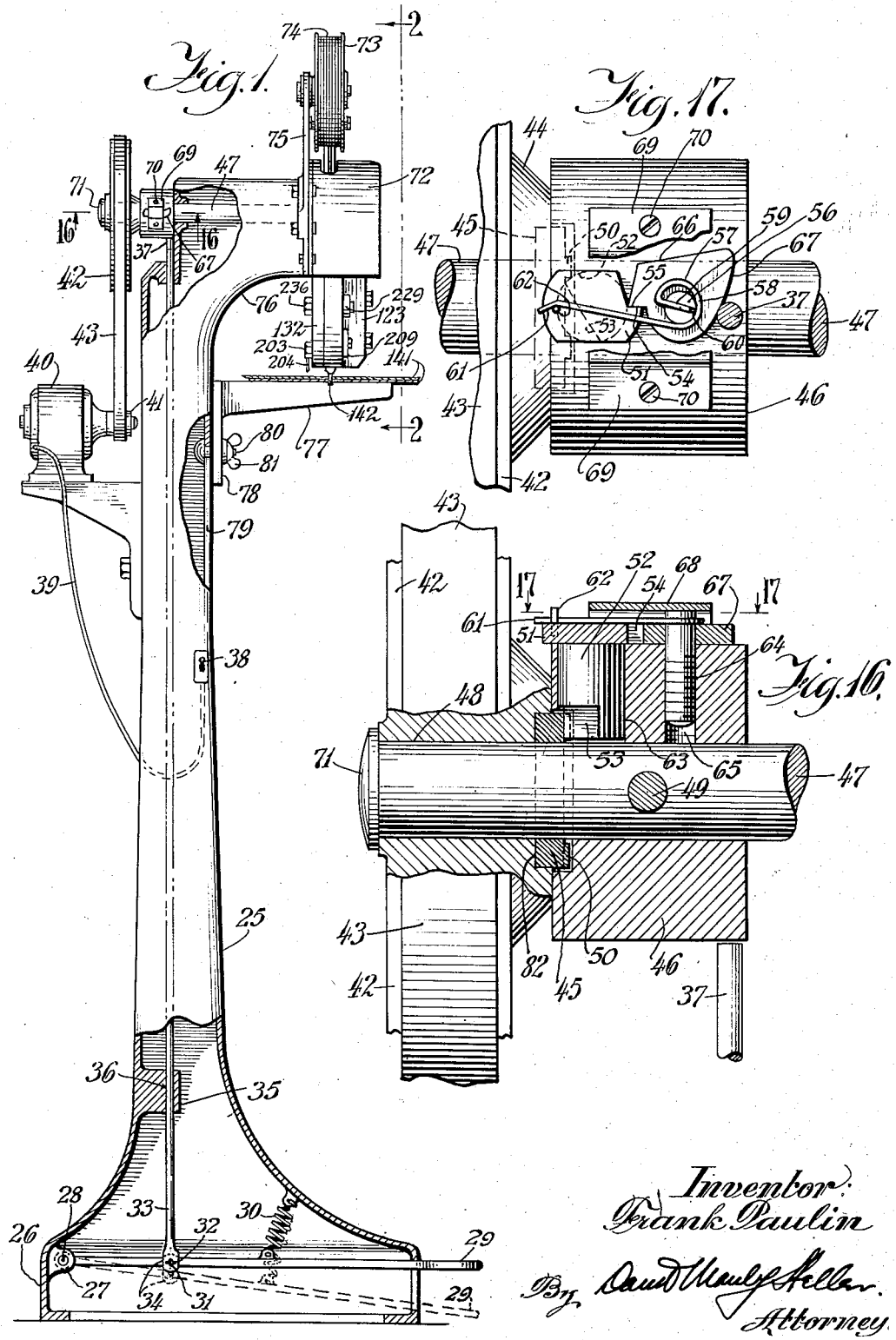

Oct. 1, 1940.  F. PAULIN  2,216,453
STAPLING MACHINE
Filed Sept. 26, 1938  5 Sheets-Sheet 2
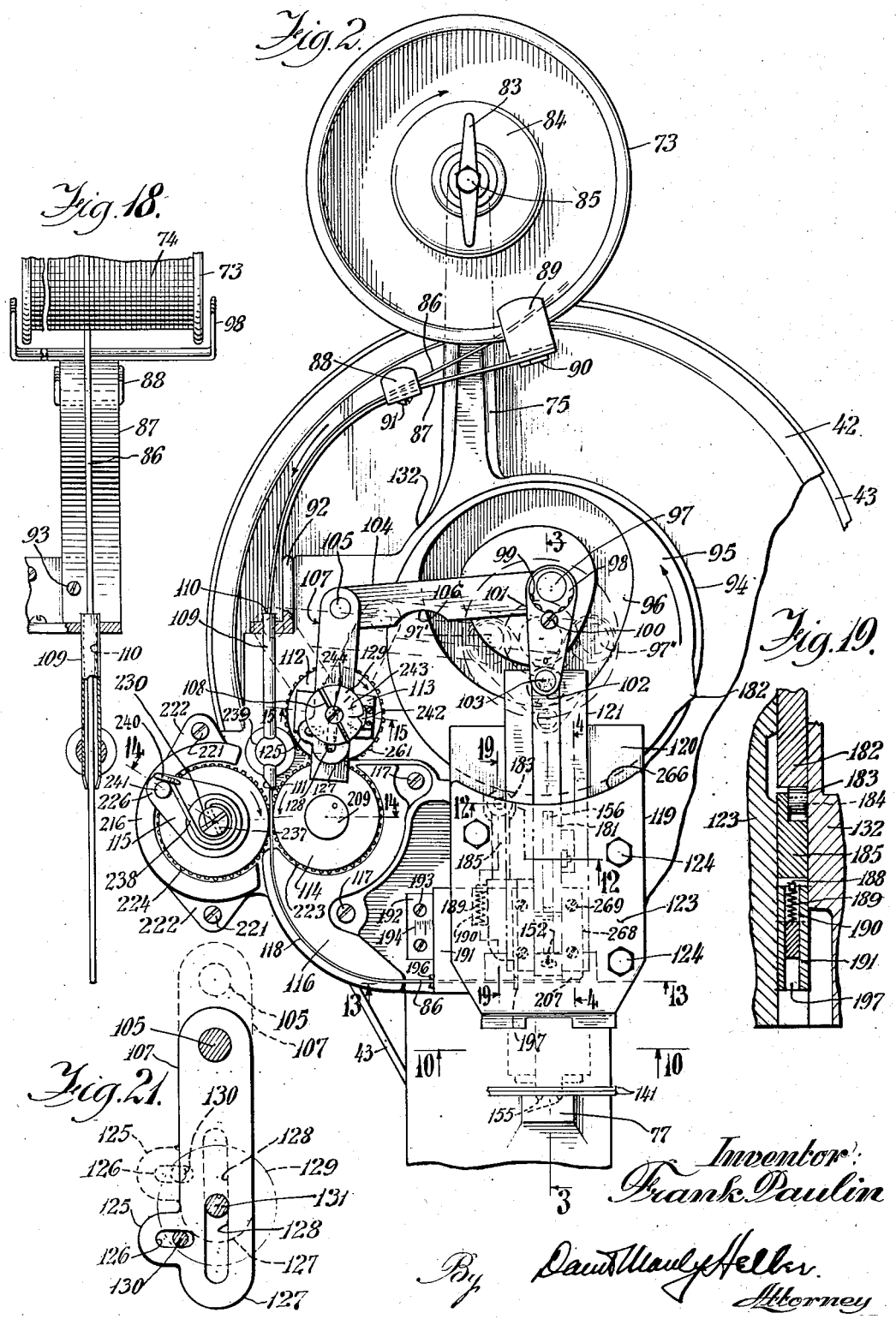

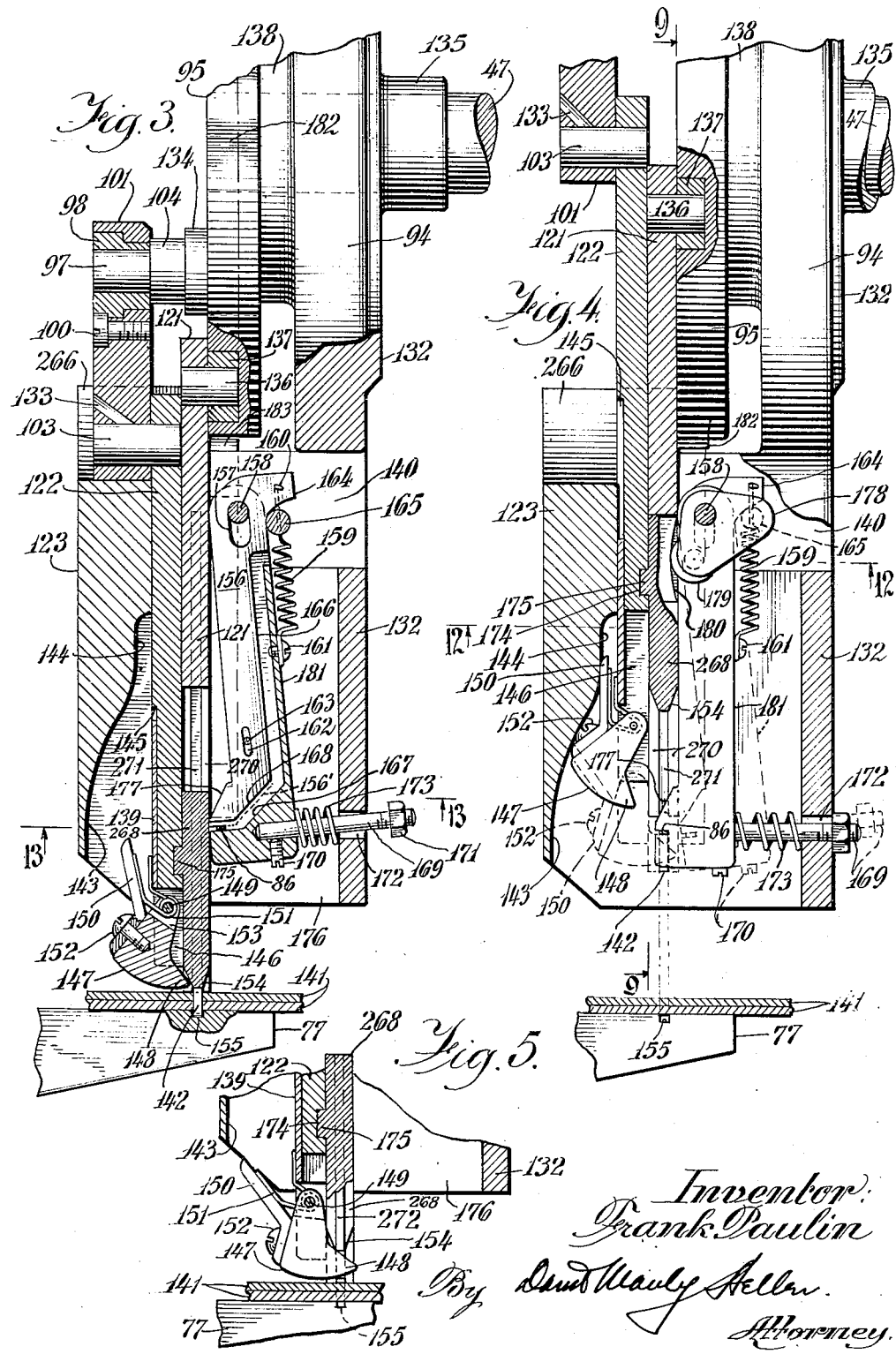

Oct. 1, 1940. F. PAULIN 2,216,453
STAPLING MACHINE
Filed Sept. 26, 1938 5 Sheets-Sheet 4
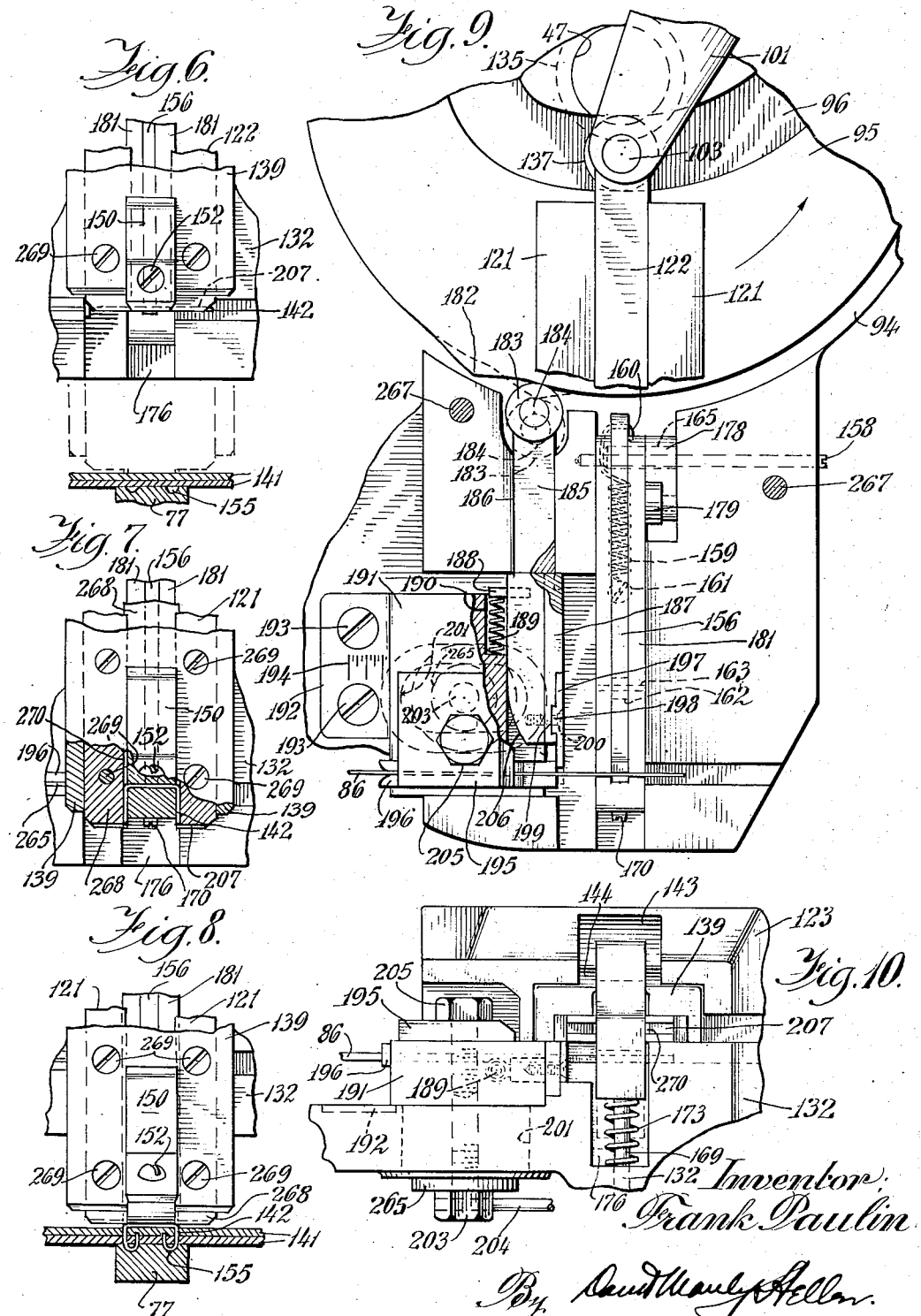

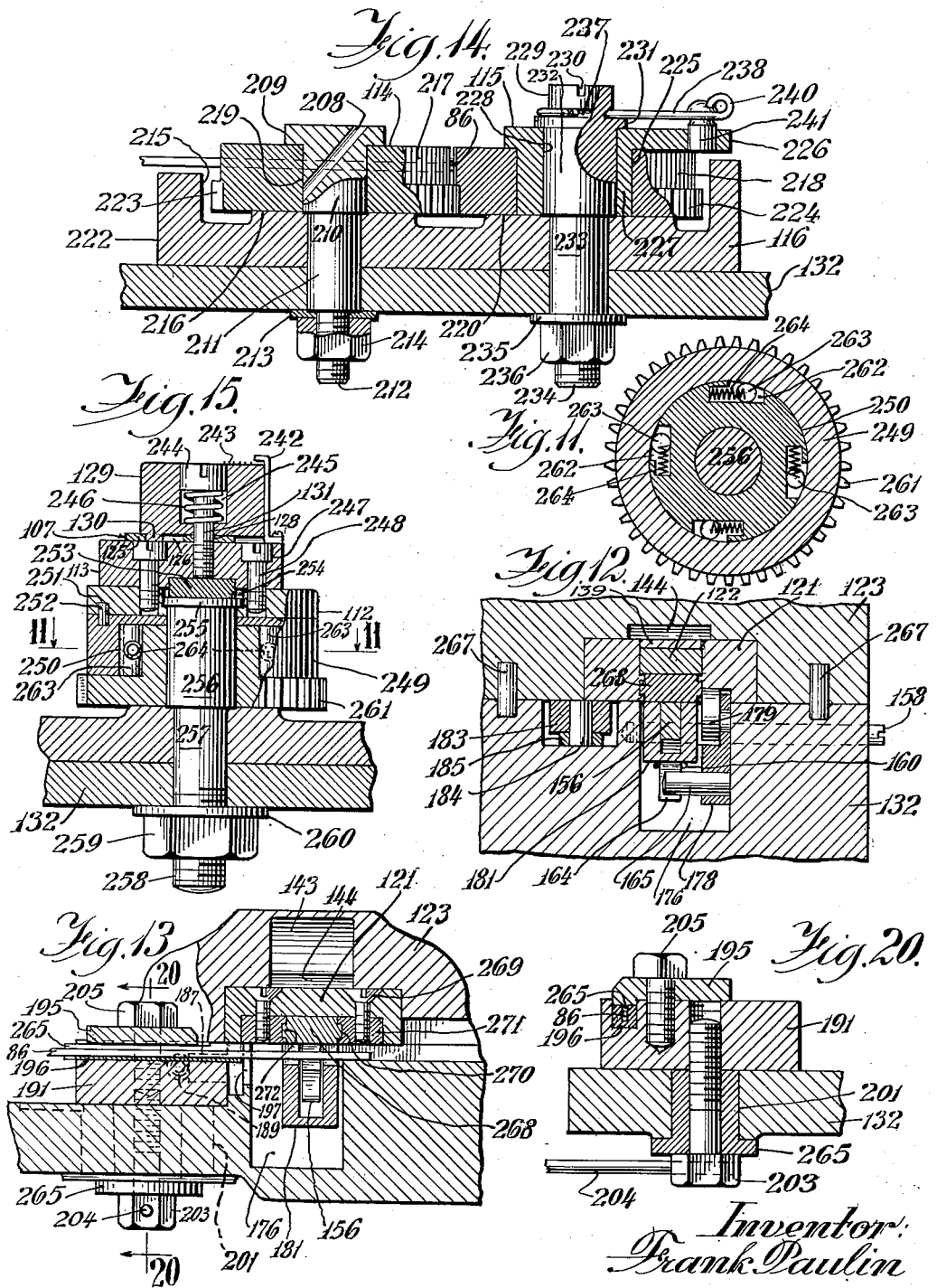

Patented Oct. 1, 1940

2,216,453

UNITED STATES PATENT OFFICE 2,216,453

STAPLING MACHINE

Frank Paulin, Chicago, Ill.

Application September 26, 1938, Serial No. 231,694

5 Claims. (Cl. 1—2)

This invention relates to improvements in wire stitching and stapling machines, and particularly box stitching machines for stitching together the parts of card-board cartons and boxes and other similar work attached with staples.

One of the objects of this invention is the provision of a spring brake means, in order to furnish a braking action to the spool containing material from which staples are made, to prevent the spool from acquiring momentum and continuing its motion after the feed rolls have completed the feeding stroke. The spool will stop instantly the moment the feeding of material has been completed.

The action of the feeding means of this invention, operating intermittently, has a tendency to impart momentum to the spool containing the stapling material, which in turn tends to kink the wire or stapling material fed from it into the feeding rolls. My brake means completely obviates this difficulty.

The object of the spring braking means, primarily, is to provide flexible feed means permitting the pulling off of material from the original spool holder and stopping the said spool after the proper amount of material has been fed therefrom.

Another object of the invention is to provide a stapling material feeding means which altho continuous in its rotary motion will feed material only thru a path of 180° and operates idly thru the remainder of the cycle or period of 180°.

Another object of the invention is to provide adjustable feeding, and cutting off means, whereby the invention may be set to produce staples of different dimensions within the range of adjustment.

Another object of the invention is the provision of a duplex head wherein the operation of cutting off, forming, driving the staple thru the material, and finally clinching it is done in one complete stroke.

Another object of the invention is the provision of eccentric link feeding means adapted to feed the material for making the staples.

Another object of the invention is the provision of a novel clutch mechanism and structure, ideally adaptable and suited for this type of stapling machine.

Another object of the invention is the provision of a single cam actuating means which governs the entire operation.

Another object of the invention is the provision of an adjustable anvil, which can be set in order to effectively clinch the staple depending upon the thickness of the materials which are to be held together by the staple.

Inasmuch as material used in conjunction with this stapling machine may be of a compressible nature such as card-board, rubber, leather, or other similar materials, it is essential, at times, to effect a tighter clinching action depending on the amount of compression the thickness of the material can withstand.

To this extent I provide an additional adjusting means for the slide arrangement that I have provided, so that it may be adjusted to compress the material while clinching and without it being necessary to adjust the anvil micrometrically.

The adjustment operation is facilitated by means of a simple eccentric arrangement provided on the inner slide and is one of the important features of my invention.

Another object of my invention is the provision of a compact and simple construction reliable and efficient in its operation, capable of extended use without repair and adjustments, and economical to manufacture in quantity production.

These and other objects will become more apparent from the following description and drawings; it is understood, however, that the drawings are for the purpose of illustration only, and not a definition of the limit of the invention, reference being had for this purpose to the appended claims.

In the drawings wherein like symbols represent like parts:

Fig. 1 represents a side view of the stapling machine comprising my invention, with certain portions of the frame-work casting removed, in order to more clearly show the treadle and operating members which control the operation of the head.

Fig. 2 represents a front view of the head of my stapling machine with the guard or cover removed looking in the direction 2—2 of Figure 1.

Fig. 3 represents a longitudinal cross-sectional view on the line 3—3 of Figure 2.

Fig. 4 shows a longitudinal cross-sectional view on the line 4—4 of Figure 2.

Fig. 5 shows a fragmentary cross-sectional view at the point where the clinching operation of the staple is about to commence.

Fig. 6 represents a fragmentary front view of the duplex slide arrangement holding the length of severed wire preparatory to forming the same into a staple.

Fig. 7 shows a fragmentary front view of the duplex slide arrangement with the outer slide advanced to the position where the staple is formed into a U shape.

Fig. 8 represents a front view of the duplex slide arrangement completing the stroke and clinching the staple into the material placed on the anvil of the machine.

Fig. 9 represents a front view looking in the direction 9—9 of Figure 4.

Fig. 10 is an end view of Figure 9, and is also represented on Figure 2 looking in the direction 10—10.

Fig. 11 is a transversal cross-sectional view on the line 11—11 of Figure 15.

Fig. 12 is a transversal cross-sectional view looking in the direction 12—12 of Figures 2 and 4.

Fig. 13 is a transversal cross-sectional view looking in the direction 13—13 of Figures 2 and 3.

Fig. 14 is a transversal cross-sectional view looking in the direction 14—14 of Figure 2.

Fig. 15 is a transversal cross-sectional view on the line 15—15 of Figure 2.

Fig. 16 is a transversal cross-sectional view on the line 16—16 of Figure 1.

Fig. 17 is a view looking in the direction 17—17 of Figure 16 with the bracket support partially broken, to show the clutch mechanism.

Fig. 18 is a fragmentary side view of Figure 2 showing the wire feeding spool holding the stapling material and the method of feeding it to the feeding rollers.

Fig. 19 is a longitudinal cross-sectional view on the line 19—19 of Figure 2.

Fig. 20 is a longitudinal cross-sectional view on the line 20—20 of Figure 13.

Fig. 21 is a diagrammatic view showing the method of adjustment for increasing or decreasing the size of the staple made by my stapling machine.

Referring to Figure 1, wherein I show a view of the complete assembly of my machine, the numeral 25 designates the base proper, which is provided with a lower pedestal 26, preferably hollow thruout the entire column, and is also provided with bearings 35 in which the rod 36 is guided.

The column 25 is provided with a rear pedestal on which is mounted a suitable motor designated by the numeral 40, having its terminals connected thru the wire 39 to the operating switch designated by the numeral 38. The upper part of the column 25 is arched at 76 to provide support for the head 72.

The column 25 is provided with a slot 79 which enables one to adjust the base 78 of the anvil 77. The screw 80 and the wing nut 81 are adapted to hold the anvil securely in place after positioning.

The motor is provided with a driving pulley 41 connected to the driven pulley or flywheel 42 by the belt 43. The flywheel 42 has a hole 48 and is mounted so that it is free to rotate on the shaft 47, which has a head 71 in order to maintain the pulley 42 and confine it between the head 71 and the clutch 46.

The pulley 42 has a tapered hub 44 into which is fitted the hardened disc 45 adapted to engage the clutch 46. The other end of the shaft 47 is fitted into the bearing 135 of the casting 94 and is driven into the cam 95 causing it to be integral with the shaft 47.

The pulley 42 is connected to the main driving shaft 47 of my device and machine, thru a clutch member generally designated by the numeral 46. The freely running pulley 42 is arranged to engage the clutch member by virtue of a treadle 29 which is pivoted on a bearing 27 of the base 25.

This treadle has a lug extension connected to a spring 30, said spring being anchored to a lug of the main casting, which tends to keep the treadle bar in a normally upward position. The treadle may be depressed to the dotted position 29 indicated on the drawing of Figure 1.

At some point between the pivot 28 of the treadle, and the spring 30, the rod 36 is attached by virtue of the extension 33 having a flattened fork construction designated by the numeral 34, a pin driven thru a hole in the fork 34 and the treadle bar 29, and held in place by the cotter pin 32 thus maintaining the bar 36 connected permanently to the treadle 29.

The rod 33 has an extension at the top designated by the numeral 37 which is the actuating extension for permitting the clutch to become engaged when the treadle member 29 is depressed.

In order to describe more thoroughly the operation of the clutch structure, reference may be had to Figures 16 and 17, wherein I show a clutch housing generally designated by the numeral 46 and being suitably drilled for the shaft 47 to be inserted therethru.

The collar of the clutch portion designated 46 is secured to the shaft 47 by means of a pin or taper pin designated by the numeral 49.

Looking at Figure 17 it can be seen that I provide two toothed clutch dogs which engage with one another effecting a connection of the mechanical clutch members herein provided.

The structure is comprised of a plate 66 shaped approximately as shown, having a toothed extension designated by the numeral 55 and having a hole drilled therein in order to rotate about the screw designated by the numeral 56.

The portion 46 is suitably threaded with a hole 65 in order to receive the screw 56 which is threaded for a portion of its length designated by the numeral 64, and which has a slotted portion designated by the numeral 60 used for anchoring the spring member designated by the numeral 58. The spring 58 is bent into a semicircular loop designated by the numeral 57, the end 59 being inserted into the slot 60 of the screw 56.

The other end of the spring is bent slightly as indicated at 61 in order to abut the pin 62 driven into the dog 51. The member 51 is shaped approximately as shown, having a toothed portion 54 which engages with the toothed portion 55 of the dog 56 and has a cylindrical extension designated by the numeral 52 which fits rotatably into the hole 63 of the clutch portion 46.

The cylindrical extension 52 has a flat portion designated by the numeral 53, which is, preferably, hardened for engagement with the toothed structure 50, which is part of the insert 45. The insert 45 is mounted or driven into a recess in the driving pulley designated by the numeral 82.

The disc 45 is provided with two teeth 50 diametrically opposed, which teeth are hardened in order to withstand the wear caused by the constant engagement of the teeth 50 with the flat portion 53.

In normal operation, the motor, when the switch is closed, operates constantly, and the driven pulley 42 idles along until the clutch pedal 29 is depressed. As the pulley is rotating idly around the shaft, the treadle bar 33 has its upper extension designated 37 riding the periphery of the clutch portion 46.

It can be seen in Figure 17, by virtue of the cam surface 67 on the dog 66, that when the treadle bar 36 hits the cam surface 67 it will cause the toothed portion 55 to engage the toothed portion 54 causing the extension 52 to be rotated on its axis, so that the flat portion 53 is brought into a position free from engagement with the teeth 50.

Now when it is desired to engage the clutch or to operate the stapling head, the treadle bar 29 is depressed which in turn causes the extension 37 to be lowered, thus permitting the spring 58 to return the clutch dogs 66 and 51 to normal position. In this position and by virtue of the spring designated 58 the dog designated 51 is orientated so that the flat 53 extends sufficiently to engage the teeth 50.

Whereas, when the treadle bar is in its normal position as indicated, the portion 37 riding the periphery of the clutch member 46, the driven pulley 42 in turn engaging the clutch dog 53, the flat portion will tend to rotate the clutch until the cam surface 67, actuated by the bar 37 will orientate the dog 51 to such a position, that the flat portion 53 will be brought out of contacting relationship with the teeth 50, and as long as the extension 37 is riding the outer periphery and contacting the cam surface 67 the clutch will only engage for a slight instant and until the cam surface 67 causes disengagement.

However, when the treadle bar is depressed, then the rod 37 no longer contacting the cam surface 67, will cause the dogs 66 and 51 to assume their normal position because of the spring 58, and whereby the flat portion 53 will be so orientated as to present a contacting tooth or edge to be engaged by the teeth 50.

In this manner the entire mechanism hereafter to be described is set in motion to perform the operation for which the machine is intended. It is merely sufficient to step on the treadle to effectuate engagement of the clutch dog mechanism with the flywheel. It is merely necessary to step on the treadle and the action takes place almost instantaneously, making one complete revolution of the flywheel and then coming to rest.

The assembly of the clutch dog mechanism is held in place by a U shaped plate designated by the numeral 68 having two flanges designated 69 and held to the clutch member 46 by virtue of the screws 70. The clutch portion 46 being suitably threaded to receive the screws 70.

By referring to Figure 2 where the head or operating portion of my invention is drawn in detail, the numeral 73 represents the spool on which the wire or material 74, used for forming the staple, is wound.

The spool 73 rotates freely on a suitable shaft mounted in the extension 75 of the main framework of the head structure, and is held in place by a cap 84, and a threaded handle designated by the numeral 85 having extensions 83 for clamping the said flange 84, thus holding spool 73 in place.

The material from which the staple is formed is designated by the numeral 86 and that is pulled off the spool 73 by the feeding roll structure later to be described; the reel is adapted to rotate freely permitting the pulling off of the proper quantity of wire needed for forming the staple.

The strip material 86 is guided to the feeding rolls over a spring brake designated by 87, attached to a bracket extension designated by the numeral 92. The spring brake has attached thereto a U shaped portion 89 which straddles the flanges of the material spool 73 thus locating it in place.

The member 87 is also provided with an additional and narrower U shaped structure designated 88 by virtue of which the material 86 is confined laterally. The U shaped portion 89 is held in place by the screws 91, whereas the U shaped portion 89 is held in place by the screws 10 designated at 90 or by spot welding or any other manner of fastening.

The spring brake 87 is secured to the bracket extension 92 by screws 93. The material is then fed into a tube designated 109 having a hole designated by the numeral 110, and being cut at an angle as designated at 111, in order that it may be placed in between the feeding rolls and as close to their point of tangency as is possible, so that the material 86 may be rigidly supported during the entire path of the operation of feeding.

The tube guide 109 is secured in a clamping means designated by 239, having a suitable hole therein for positioning this guide tube 109 in place as close to the feeding rolls as is found necessary and most advantageous.

The main frame casting is provided with a boss or pad designated by the numeral 94 on which rides the cam designated by the numeral 95. This cam is secured to the end of the shaft 47 which terminates within the rim structure. The cam 95 is provided with a race 96, the purpose of which will be hereafter explained, and also with a surface cam extension designated 182.

The cam structure has mounted thereon a stud 97 having an enlarged portion 134 driven into the cam 95 upon which rotates an adjustable eccentric 98 having notches 99 for engagement with the screw 100.

This arrangement on which is mounted a lever designated by the numeral 101, and which furnishes movement to the inner slide designated by the numeral 122, permits, by virtue of the eccentric 98, and because of the respective notches, to decrease or increase the differential or relative travel between the slide 121 and the inner slide 122.

The purpose of this arrangement is to enable clinching a staple with a smaller or larger increment of space between the respective closing point of the staple and its top portion, and depends upon the compressibility or resiliency of the material that is being stapled.

On the center pin 97 is mounted the lever designated by the numeral 104 which is mounted on a pin 105 at its opposite end, the pin 105 rotating freely in the parts 107 and 253. The lever 104 is provided with a cut out portion 106 to clear the edges or corners of the assembly designated 113, during operation of the machine.

The portions 107 and 253 are connected to the driving gear member designated by 112, which in turn meshes with the gear 114, while the gear 114 meshes with the gear, which in turn is connected to the gear assembly 224.

The stapling material 86 after being sent thru the guide tube 109 and between the gear assemblies 114 and 224 is guided in an arcuate track designated 118 which is cut in the main casting and guided thru the shoe 196 to the duplex slide mechanism which cuts off, forms, drives the staple thru the material and closes it.

The view of Figure 21 shows in detail the operation of the adjustments that I utilize in controlling the length of staples to be made. This arrangement comprises a lever generally designated 107 heretofore mentioned, pivoted on the pin 105 and in turn slidably attached to the body 131 of the screw designated 244.

The member 107 is provided with a projection designated 125 having a slotted portion designated 126 and also a central slotted portion designated 128 which fits slidably over the screw body portion 131, the lower end 127 being rounded off as shown.

The member 129 is pivoted about the screw 131 and is provided with a series of graduations designated 243 and an indicator showing the relative movement of the adjusting disc 129. This disc 129 is also provided with a slot 108 which may serve the purpose of receiving a screwdriver to aid in conveniently setting it in adjustment. When the member 129 is set to a particular division the screw member 244 is tightened in place, the spring 246 tends to keep the disc 129 under tension control when the screw member is loosened, preparatory to adjusting the member 253. After adjustment the screw 244 clamps the piece 253 in definite leverage relationship and the compression of spring 245 caused by the tightening of screw 244 maintains the piece 129 in position.

The adjustment thus obtained causes shortening of the fulcrum position of the piece 107 with respect to its hinge pin 105. The disc 129 which is provided with the extension 130, when it is rotated about the body 131 of the screw 254, causes the linkage or the distance between the screw body 131 and the center of the pin 105, to increase or decrease, as shown by the dotted lines of the portion 125, which is either moved up or down. This effects a longer or a shorter leverage between the point 105 and the screw 244.

The throw of the crank pin 97 is constant and is namely from the center of the shaft 47 to the center of the hinge pin 97, altho the relative arc described by the lever 107 being the same, the angle thru which this causes the gear 112 to travel thru, inasmuch as it is pivoted and secured thereto, causes either a larger or smaller angle to be described, which in turn motivates the periphery of the gear 112 a greater number of teeth or a lesser number of teeth. In other words the crank pin 97 having a fixed position and movement, either describes the arc of a larger or smaller circle, depending on its adjustment, which if part of a smaller circle will confine a larger included radial path.

When the pin 97, as shown by the dotted line, travels from the position 97' to the position 97" the gear 112 drives the gear 114, the gear 114 in turn driving the gear 224 which causes the feeding to take place, and completes the feeding of the wire 86.

When the pin 97 is then brought from the point 97" back to the point 97' the gear 112 is caused to rotate in the opposite direction in which event the structure of the gear member 112 operates idly. There is a clutching action within this gear, later to be described, which tends to grip in one direction and operates idly in the opposite direction. The purpose of this structure will be more fully explained in detail later on.

In Figure 4 is depicted the operation of the duplex slide arrangement. It will be seen that the shaft 47 fits into the hub 135 on the main casting having an upright designated by the numeral 94, and a raised machine surface designated by the numeral 132, also a hub 138 on which is mounted the cam structure designated by the numeral 95.

The cam 95 has mounted in its race a roller 137 connected to a pin 136 driven into the slide 121. The auxiliary slide 122 is secured to the pin 103 and in turn to the lever designated by 101, having an extension 102 in order to provide a suitable means for attaching the pin 103.

The numeral 133 designates an angularly drilled oil groove in order to permit lubricating this point which is subject to rapid rotation.

The slide 122 has a shoulder portion designated 145 in order to clear the motion of the slide 122 within the slide 121, inasmuch as it has a front bridge structure 139 integral with the slide 121. This bridge structure 139 overlaps a recess designated by 146, in which recess is mounted a staple supporting dog designated by the numeral 147, having a wedge shaped structure designated by the numeral 148 and is mounted on the pivot 149.

The wedge shaped dog portion 147 has mounted on its heel an angularly shaped plate designated by the numeral 150, held in place by the screw designated 152. The dog portion 147 is slotted out forming a forked extension designated by the numeral 153 in which is mounted the spring 151.

The casting 132 is recessed at a point designated 140 and is arranged with a further recess 176 in order to house the structure now to be described.

The slide 122 is provided with a recess designated by the numeral 174 in order to receive the tongue portion 175 of the driving slide designated by the numeral 268. This slide has a tapered portion at its lower end designated by the numeral 154.

This auxiliary slide 268 is rigidly connected with the slide 122, the bridge member 139 and the slide portion 129 serving to confine these slides in their proper sliding relationship. The top cap designated by the numeral 123 is arcuately cut out as indicated at 266 in order to provide ample clearance for the rotating link 101.

The cap 123 is held in place on a projection on the main casting 119 by virtue of the dowel pin structure designated by the numeral 267 and the cap screws designated by the numeral 124. The casting portion 119 is recessed to provide a bed portion 120 for the slide 121.

The cap portion is also provided with a recess indicated at 143, having a restricted portion designated 144. The purpose of the recess is to operate member 147 about the hinge pin 145 in a manner which will be later described, and the purpose of which will be brought out in detail in the actual operation of the machine.

Assuming that the staple has been fed thru to this point what occurs here is as follows:

The staple material designated by the numeral 86, after having been cut off is gripped by the structure comprised of the jaw 181 and the jaw 156. The piece designated 181 is cut out as indicated at 167 in order to permit the piece designated 166 to be mounted in the central portion of the piece 181.

The jaw has a rounded top extension into which is driven the pin 158. The portion at the lower end of this piece 181 is angularly cut out or notched out as indicated at 167, and provides a support for the material 86.

The piece 156 is shaped approximately as shown and has an extension 164 which rides on the pin structure 165. The top portion is provided with an elongated slot 157 which is adapted to slide on the pin 158. It is also provided with another slot further below designated 162 adapted to slide over the pin 163 driven into the member 181.

It will be noticed that the lower portion of the piece 156 is configurative with the surface 167, and the surface 168 is shaped to provide a parallel opening in between the piece 156 and the piece 181.

The pin 165 and the roller assembly 179 as well as the pin 158 are tied together by the triangularly shaped plate designated by the numeral 178 and confined within the recess 140.

The extension 164 has a hole drilled therein in order to receive the loop designated 160 at one end of the spring designated 159, and the opposite end of the spring is anchored at a point on the portion 181 and is secured by the screw member 161.

The slide member 121 is provided with an arcuate recess or cam portion designated by the numeral 180 and which is adapted to operate or oscillate the plate assembly 178 about its hinge member 158 so that the pin 155 co-acting with the extension 164 will cause the gripping vice jaws 168 and 167 to release their grip on the material 86; the slide 268 travelling down and by virtue of its bevelled surface 154, in turn, will cause the angular cam surface 177 to be swung outwardly to the dotted position 170 as indicated.

Of course, it can be seen that before the assembly of the piece 181 and 156 are swung out on the hinge pin 158 to the dotted position indicated, that the gripping jaw 156 will first be acted upon to release its hold on the piece of material 86 for making the staple.

The piece 181 is provided with guide pin structure 169 suitably threaded to receive the lock nut 171, and the casting 132 is suitably drilled with an enlarged hole 172 to permit of the angular movement of the piece 181, and is necessarily elongated in order to permit the free movement of this piece.

The purpose of this pin is to act as a support for the spring 173 which tends to keep the assembled unit of the jaws 181 and 156 in a normally vertical position, and permits them to reassume that position once the slide has again moved upwards.

The pin 169 is held in a hole drilled in the jaw 181 and set in place by a set screw designated by the numeral 170.

The view in Figure 4 shows and designates the relation of the different parts at the beginning of the stroke, when the jaws have gripped the material and the slide continues to travel downwardly.

In Figure 5 the slides have been moved a sufficient distance so that their differential movement has caused the staple 142 to be formed into a U shape, and it can be seen that the supporting dog 147 is lodged in between the legs of the U shape of the staple.

On the further downward travel of the driving slide by virtue of the wedge shaped portion 148, the support 147 is caused to swing outwardly about its pivot 149 as the staple is being driven, so that the staple is supported from within by the member 149 as well as from without by the outer slide during the entire time that it is confined within these slides, and is given sufficient and complete support during the operation of clinching.

In Figure 3 the clinching operation is almost completed and the slides are at their lowest position which causes the legs of the U shaped staple 142 to curl under by virtue of the notches 155 in the anvil 77, and it can be seen how the wedge shaped portion 148 is completely thrown out of gripping or supporting position once the staple is definitely driven into the material 141 which is being stapled.

In Figure 6, I show the slide 139 as connected to the slide 121 in a preliminary position after the wire has been cut, an operation to be later explained, where it shows that the slide 121 is provided with a slot designated 207, which fits the shape of the stapling material and helps to hold the cut off staple material in position.

Here also can be noted the gripping members holding the staple in place as designated by the numerals 181 and 156 and the piece or member 147 supporting the staple in the slide 121. The slide continues travelling downward, until it assumes the position indicated by the dotted lines.

In Figure 7, I show the slide 121 advanced downward. The slide 121 is comprised of two pieces and connected to the portion tieing them together designated by the numeral 139, the pieces 121 being attached by the screw members designated 269.

In this view it can be noticed that the staple 142 is formed into a U shape and the portion 147 is swung into the opening of the U portion to help support the staple thruout and strengthen the staple so that it can be driven in. Without this inner support the staple would have a tendency to buckle inwardly.

In Figure 8, I show the next step in the cycle of operation wherein the slide has completed its travel as indicated by the dotted line in Figure 6, and I also show the semi-circular notches 155 in the anvil 77 which tends to curl the staple upward into the material.

In Figure 9 the cut off arrangement is illustrated in detail and also the piece needed for making the adjustment for the length of the staple, and which works in conjunction with the adjustment dial 129 heretofore described and illustrated in Figures 2 and 21.

The casting 132 is suitably recessed and is provided with a slot designated by the numeral 186; the recess is provided in order to clear the roller 183 and its movement up and down. The roller 183 is mounted to rotate freely on the pin 184 which is driven into the slide portion 185.

The cam projection 182 is provided in order to move this slide 185 in a downward direction, it being returned to its normal position by the spring 189. The roller 183 moves to the dotted position designated by 183, whereas the slide 185 rides the top surface of the member 187. The pin 188 driven into it holds the spring 189 in a recess 190 so as to confine its pressure which tends to return the roller assembly 183 and the slide 187, tending to keep the assembly in contact with the contour of the cam 95, so that when it meets with the projection 182 it will be caused to operate in a downward movement the spring 189 maintaining the roller 183 at all times in contact with the periphery of the cam.

The block 191 is mounted on a plate designated by the numeral 192, which in turn is mounted on the casting by virtue of the screws 193. The plate 192 is provided with a series of graduations 194 numbered so as to agree with the graduations 243 on the adjusting piece 129. This block 191 is adjusted to a distance equivalent to one half the difference in the increase of the length of the staple, in other words the block is moved and adjusted only one-half of the adjustment distance made on the rotating adjusting member designated by the numeral 129.

The block 191 is confined by the screw 203 which has a pin driven into its head designated by the numeral 204. The screw 203 clamps the block 191 by virtue of the slot 101 in the casting. In order to effect an adjustment it is only necessary to turn the screw 203 about a quarter turn so that it is sufficiently loose to allow the block 191 to be moved to the desired marking or indication 194, then the pin handle 204 is rotated in order to lock the position to which the cutting off mechanism, integral with the block 191, has been moved.

The block 191 has driven into it a hardened shoe designated by the numeral 196 having a slot designated by the numeral 265. This shoe is held in place by the clamping member 195, which also has an extension to clamp over the open end of the slotted portion 265 of the shoe 196, in order that the wire 86 be confined definitely in its path.

The cap 185 is held in place by a suitable cap screw designated by the numeral 205 and threaded into the block 191.

The screw member 203 has mounted thereon a suitable bushing designated by the numeral 265 which fits within the slot 201, preferably elongated, as shown in Figure 13 and facilitates adjustment and setting.

The slide 187 is preferably cut off to a shape 206 in order to provide clearance in its downward travel so that it will not contact or interfere with the shoe 196. The shoe 196 at its forward end is, preferably, hardened and ground and cooperates with the cutting punch designated by the numeral 197 having tongue member designated by the numeral 198 and fitting in a configurative U shape slot 199 in the slide 187, being held definitely and firmly in place by the screw designated 200.

The travel of the slide 187 in a downward movement will cause the knife to cut the material against one of the edges of the slot 265 of the shoe 196. It can be seen in this view (Fig. 9) how the length of the material for the staple is then firmly held in place by virtue of the jaws 181 and 156.

The adjustable feeding means can be seen by reference to the views of Figures 11, 14, and 15. In Figure 14 is shown the gearing arrangement for feeding wire stapling material into the proper position, and the proper length of material fed and governed by virtue of the mechanism shown and illustrated in this view.

The gear 224 is preferably provided with a hub extension designated by the numeral 218 and a recess portion designated by the numeral 225, on which is mounted the eccentric member designated by the numeral 115 having a shoulder 227 and an extension portion 226. In this extension portion 226, the pin 241 is secured, which has a groove for receiving the spring 238 formed at its end into a loop designated at 240.

The member 115 has a hub extension 227 which is suitably recessed as at 228 in order to fit the center stud designated by the numeral 229. The stud 229 is provided with a slotted top portion designated by the numeral 230 which is secured to the extension 237 of the spring 238. The center stud member 229 is also provided with a flange 231 and an enlarged body portion 232, a reduced shank 233, terminating with a further reduced and threaded shank 234, which last mentioned shank fits within the castings 116 and the casting 132.

The casting 116 is attached to the main frame casting by screws 117 and is provided with a boss portion 222 on which rides the gear 224. The central stud 229 is held in place by a washer 235 and a nut 236 which attaches to the threaded portion 234.

The recess 215 is large enough to provide clearance for the rotation of the gear 223. The bosses 216 and 220 provide bearing surfaces for the gears 223 and 224. The gear 223 is provided with teeth also and co-acts with the teeth of the gear 224, and is also provided with a hub portion designated 217 held in place by the stud 209.

The stud 209 has a reduced shank portion 210 and a smaller shank portion designated 211, and a still smaller threaded shank portion designated 212. The oil hole 208 is for the purpose of lubricating the portion 210.

The shoulder portion 210 is housed within a recess 219 of the gear 223 which rides on the boss 216 of the casting 222. The casting 222 is attached to the main casting 132 by the screws 221.

The shank 211 is fitted within the recesses in the castings 222 and 132 being definitely held in place by virtue of the washer 213 and the nut 214 attached to the threaded shank portion 212.

The portions 217 and 218 are suitably knurled with a fine knurl in order to offer a better traction or gripping means for the wire 86 which is fed between these feeding rolls.

As mentioned heretofore, when the gears are rotated in one direction that will cause the eccentric portion or arm 226 to be moved whereby the surface 218 will be brought into contacting engagement with the surface 217 by virtue of the thickness of the material 86. The thickness of the material controls and limits the extent of the rotation of the eccentric when contact is made.

The spring 238 has a tendency to return this eccentric to normal position, inasmuch as it is resting against the pin 241 driven into the extension 226. The teeth of the gear are constantly in mesh, whereas the eccentric portion has a tendency to bring the surfaces 217 and 218 as close together as the thickness of the material 86 therebetween will permit.

The gear 223 meshes with the teeth 261 of the gear illustrated in Figure 15. This gear being the gear connected to the adjustment member 107 heretofore designated and can be seen more clearly in this view.

The feed link 104 being connected by the hinge pin 105 to the double link construction designated by 107 and 253 heretofore mentioned, is connected in spaced relationship brought about by the method of fastening the respective three links on the pin 105.

The adjusting knob 129 has an extension 130 operating in the elongated slot 136 so that it has a tendency to slide the link 253 within the slot designated 254 and position it in order to govern the amount of material to be fed as explained heretofore. It is also provided with a counterbore 245 to receive the fillister head 244 of the clamping screw.

The spring 246 maintains the adjusting disc 129 under pressure when the screw 244 is loosened preparatory to making feed adjustments. The pointer 242 is mounted on the piece 113 to aid in indicating a particular adjustment or setting.

The gear 251 has a hub extension designated by the numeral 250, which hub extension is provided with a series of slots as indicated and designated 252. Within these slots there is a reduced portion which is adapted to suitably house a spring member 264 which exerts pressure upon the pins designated 263. The gear member 251 is connected to a hollow drum or housing designated by the numeral 249, which is also provided with a cap designated 112, and is secured to the drum 249 by screws not shown, being located in place by the dowel pins designated 252.

The cap 112 is suitably threaded in order to receive the fillister head screws designated 246, the heads 247 being flush with the top of the piece designated 113, which is suitably slotted as at 254, in order to accommodate and provide slidable adjustment to the link 253.

After the knob 129 has been set to the proper division or marking 243, the screw member 244 which is preferably a fillister head screw, having a shank 131 threaded into the block portion 113, serves to lock the adjustment or setting in place by virtue of the end of the body 131 clamping the top surface of the link 253, thus firmly connecting the slide 253 with the gear portion 261. The gear 261 is rotatably mounted on a central stud, having an enlarged head 255, a body portion 256 and a reduced body portion 257, also a shoulder threaded extension designated 258.

The shoulder of the body 256 rests against the casting bearing which supports it and is secured by virtue of suitably drilled holes in the casting 132 being clamped in place by the washer 260 and the nut 259. This permits the gear 251 to rotate freely within the shoulder space confined between the body portion 257 and the head 255.

Whenever the link 253 is oscillated as heretofore explained, the gear is oscillated or reciprocated in right and left directions as seen on the view of Figure 2.

The block 113 being integral with the drum or member 249 will cause the gear teeth 261 to be rotated in the direction of the arrow indicated in Figure 2, and cause the drum portion 249 to rotate the gear 251 in a counter-clock-wise direction whereas when the link 107 tends to move the gear 261 in a clock-wise direction by virtue of the clutch rollers 263, heretofore mentioned and described, the drum 249 will not impart any motion to the gear 251 for the reason that the clock-wise rotation of the drum member will not grip the rollers but will tend to compress the rollers against the spring 264.

When the tendency is to rotate counterclockwise the rollers will be wedged in between the slotted portion 262, and the inner recess 250 of the drum 249, thus causing a frictional engagement between the surface of the rollers and the drum portion 249, ultimately engaging the hub portion of the gear 261.

In Figure 13 is illustrated the structure of the slide member 271 and the slide member 122, and it will be noticed that the slide 122 is provided with two slotted gibs 268, having sliding ways 270 in order to guide the extensions 272 on the inner slide 271.

In Figure 12 the structure of the slide is further shown at a point where the cross-section is taken on the line 12—12 of Figure 2, which indicates the duplex slide structure at that particular portion, and where it will be noticed how a portion of the slide 122 is fitted within the slide 121.

With regard to the operation of my stapling machine, reference is to be had to Figure 2 and the various cross-sections showing the complete cycle of operation.

To begin with by referring to Figure 2 the feeding rolls are operated as follows:

When the treadle bar in Figure 1 is depressed the clutch mechanism is contacted so that rotation is imparted to the shaft 47 which will rotate one turn. The fly-wheel being connected to the shaft 47 by the clutching means, imparts one complete turn to the cam designated 95.

By rotation of the cam 95, on which is mounted eccentrically the pin 97 carrying the feeding links 104 and 107, oscillation or reciprocal motion is imparted to the gear 112 which meshes with the gears 114 which in turn meshes with the gear portion 224.

When the crank pin moves from the position 97' to the dotted position 97'' the gear 261 engages the gear teeth 223, which in turn engage the gear teeth 224 and impart rotation to the eccentric feed roll designated by 115. The initial motion of the eccentric 115 has a tendency to bring the feed roll 218 to contact the feed roll mounted on the pivot 209, and by virtue of the spring 238 causes the two feeding rolls to contact the thickness of the material 86, it being the controlling factor and limiting the amount of eccentric rotation to be made by the eccentric 115. The material is then pushed forward into the slot 118 and thru the shoe 196 until the feed is completed.

From the position 97'' to the position 97', the return movement of the feeding means, operates the gear 112 in the opposite direction or counter-clock-wise which as explained heretofore, by the structure of its frictional clutching mechanism, will offer no rotation to the gear piece 261, and hence no rotation to the other gears 223 and 224 with which it is enmeshed.

The stapling material is then fed thru the shoe 196 to the cutting blade 197 and thru the duplex slide heretofore mentioned and described. The slides receive a differential motion, the slide 121 being operated by the race track 96 of the cam 95, whereas the slide 122 is moved within the slide 121 by the motion imparted to the link 101.

When the cam 95 rotates its projection 182 past the roller assembly 183, the cutting blade 200 is moved in a downward direction past the end of the slot in the shoe 196 thus severing the portion or length of wire required for making a staple.

At the same time the assembly of the vise jaws 181 and 156, by virtue of the cam race 180 and the spring 159 effect a clamping action between the jaws 167 and 168 holding the severed material in place after it has been cut off. The slide 121 then proceeding in a downward motion tends to form the staple into a U shape, at the same time the bevelled portion 254 on the slide member 268 moves the gripping jaws outwardly to the dotted position indicated at 181. The jaws before being swung to the dotted position 181 are opened slightly in order to release the grip on the staple 142 which is permitted to remain confined within the groove 270 on the slide 121.

At the same time by virtue of the cam portion 143, the central supporting and reinforcing wedge shaped dog 148 is forced in between the two sides of the staple, so that it is definitely reinforcing the outside as well as the inside of the staple 142.

The slides continue in their downward movement when the ends of the U shaped staple 142, which has just been formed, are caused to pierce the material 141 and project into the recesses 155 of the anvil.

The bevelled portion 154 of the slide tends to swing out of engagement the wedge shaped dog 148 as the staple is being driven in, whereas the recesses 155 tend to deflect the end of the staple in an arcuate shape returning the ends of the staple in an upward direction thus clinching the material which has been placed on the anvil.

The slides in their further movement return, and the cycle is completed bringing the parts to a normal position, ready for a second or ensuing clinching operation, depending on the depression of the treadle 29, whence the cycle of operation just described will be repeated.

I believe I have illustrated and described the construction as well as the operation of my stapling machine in distinct terms, so that those skilled in the art should have no difficulty in apprising themselves of the operative mechanism, which I have herein expounded.

I have shown a preferred form with the main objects in view, as heretofore enumerated, and altho a specific construction has been shown in the drawings, it is no doubt appreciated, that the arrangement is susceptible of many modifications, changes and alterations.

It is my intention, and I reserve the right to any such changes, modifications, and alterations that may come within the scope of my invention, and it is desired that the present form herein shown as exemplary of a means of producing the results to be attained, shall not be limited or defined by the drawings or description, except only in so far as the prior art which exists on the filing of this application, my invention being more specifically and broadly defined in the appended claims.

Having thus described my invention what I claim as new and desire to secure by Letters Patent is:

1. In a stapling machine, friction clutch oscillating feed means, comprising a reciprocating driving gear meshing with an intermediate gear engaging a driven gear, the said driving gear provided with a hub extension, having a series of recesses, a drum member having a recess portion adapted to fit rotatably on the said hub extension, a series of rollers slidably mounted in the recesses in said hub extension, spring means normally urging the said rollers in position to effect frictional engagement intermediately between the said hub extension and the said recessed drum members, and adapted to feed during one half of the oscillating cycle, and adapted to idle during the remainder of the cycle.

2. In a stapling machine, the combination of means for feeding stapling material, and flexible brake means rigidly secured at one end, its opposite end free to brake against a feeding drum, the intermediate portion of said braking means providing braking action to a strand of wire during the feeding operation, the said flexible brake means adapted to brake the feed of a wire strand during the feeding operation and also adapted to check rotation of the drum during intervals between successive feeding operations.

3. In a stapling machine, provided with stapling material feeding means, stapling material cutting off means, staple forming means and staple driving means, a single cam member having a cam race adapted to operate the said staple forming means, a pivot member eccentrically mounted on said cam member having articulately secured thereto link means adapted to operate the said staple driving means, the said pivot member also having attached articulately thereto link means adapted to operate the said stapling material feeding means, the said cam member also provided with cam means adapted to operate the said stapling material cutting off means.

4. In a stapling machine, provided with stapling material feeding means, stapling material cutting off means, staple forming means, and staple driving means, a single cam member having a cam race adapted to operate the said staple forming means, a pivot member eccentrically mounted on said cam member having articulately secured thereto link means adapted to operate the said staple driving means, the end of said link means having secured thereto an eccentric bushing member, the said pivot member also having attached articulately thereto link means adapted to operate the said stapling material feeding means, the said cam member also provided with cam means adapted to operate the said stapling material cutting-off means.

5. A stapling machine having in combination, stapling material feeding means, stapling material cutting-off means, staple forming means, staple driving means, a single cam member provided with a cam race adapted to operate the said staple forming means, a pivot member eccentrically mounted on the said cam member having articulately secured thereto link means adapted to operate the said staple driving means, the said pivot member also having articulately secured thereto link means adapted to operate the said stapling material cutting-off means, a main driving shaft member secured to said cam member, clutch means secured to said driving shaft member, a driven pulley member secured to said driving shaft member provided with clutch engaging means and adapted to rotate freely on said driving shaft member, normally, in engagement with said clutch means, and treadle means adapted, normally, to trip the said clutch means disengaging it from the said driven pulley member.

FRANK PAULIN.